United States Patent [19]

Hotz et al.

[11] Patent Number: 4,661,243
[45] Date of Patent: Apr. 28, 1987

[54] METHOD AND APPARATUS FOR TREATING MOIST DUST AND MUD IN THE STEEL INDUSTRY

[75] Inventors: Rainer Hotz, Werne; Herbert Muszkiewicz, Dortmund, both of Fed. Rep. of Germany

[73] Assignee: Hoesch Aktiengesellschaft, Fed. Rep. of Germany

[21] Appl. No.: 703,812

[22] Filed: Feb. 21, 1985

[30] Foreign Application Priority Data

Feb. 22, 1984 [DE] Fed. Rep. of Germany ....... 3406383

[51] Int. Cl.$^4$ .................. B03B 9/04; B01F 13/02; B01D 19/00
[52] U.S. Cl. ..................... 209/10; 209/211; 210/188; 210/218; 210/294; 210/374; 210/787; 210/806; 55/52; 55/159; 55/199; 366/101; 366/174; 366/184; 406/174; 494/42
[58] Field of Search ............... 55/199, 36, 64, 52, 55/159; 209/3, 10, 12, 211; 210/806, 787, 781, 788, 188, 218, 294, 374; 406/174, 175, 93, 94, 95; 366/174, 101, 106, 184; 494/42

[56] References Cited

U.S. PATENT DOCUMENTS

| 923,571 | 7/1909 | Paterson | 366/174 |
| 2,365,293 | 12/1944 | Robinson | 366/174 |
| 3,200,068 | 8/1965 | Jorankin et al. | 209/10 |
| 3,215,509 | 11/1965 | Adams | 209/12 |
| 4,084,946 | 4/1978 | Burgess | 55/199 |
| 4,138,332 | 2/1979 | Schloffel | 210/781 |
| 4,200,529 | 4/1980 | Fink et al. | 210/806 |
| 4,316,331 | 2/1982 | Lindström et al. | 210/781 |
| 4,455,156 | 6/1984 | Ramspeck et al. | 55/52 |

FOREIGN PATENT DOCUMENTS

| 234579 | 2/1960 | Australia | 210/781 |
| 93742 | 9/1897 | Fed. Rep. of Germany | 55/199 |
| 2938717 | 4/1981 | Fed. Rep. of Germany | 210/787 |
| 7749 | 4/1979 | Japan | 55/46 |

Primary Examiner—S. Leon Bashore
Assistant Examiner—Thomas M. Lithgow

[57] ABSTRACT

In an apparatus for processing moist dust and mud from dust removal equipment, especially in the steel industry, wherein the mud is concentrated, fractionated and dewatered in several steps the mud is dewatered in a centrifugal separator, to allow the mud from the dust removal equipment of blast furnaces and steel works to be dewatered in an environmentally acceptable and simple and cost effective way.

3 Claims, 2 Drawing Figures

METHOD AND APPARATUS FOR TREATING MOIST DUST AND MUD IN THE STEEL INDUSTRY

The invention concerns a method for treating moist dust and mud from dust removal equipment, especially in the steel industry, in which the mud is thickened, fractionated and dewatered in several stages, as well as an apparatus for carrying out the method.

In blast furnace plants high iron content dust is produced by the cleaning of the stack gas material and by the casting yard dust removal equipment. In the production of steel this dust arises in the process of producing the steel itself and also at the pouring and treating stations. The dusts are usually collected and separated in primary and secondary dust removing stages. The dust removing equipment can use either wet or dry separators.

In the case of wet dust removal there is yielded a suspension with small solid particles which generally for further treatment are concentrated in settling vessels.

In the case of dry dust removal the dust is collected in dry form. For further treatment it must be moistened. The procedure with the least problems is to over-moisten the dust, that is to make a suspension of a consistency similar to that in the settling vessel.

The dust has a very wide grain spectrum. Contaminant concentrations such as, for example, of zinc and lead mainly appear as fine grains. Only the coarse grained portion is largely free of contaminants so that it can be inserted into and reused in the smelting process.

It is known for the separation of the dust into coarse and fine grains to be accomplished through the use of a cyclone separator.

The fine grained portion, which up to present times has not been reuseable, is thickened in a settling vessel and is dewatered in known ways in chamber filter presses, vacuum drum filters, band sieve presses, filter tube presses or filter membrane presses. To some extent even a thermal supplemental drying, for example, in rotating tube ovens, is required for disposing of the material.

These known methods and apparatuses are very costly as capital investments and to operate and require a large amount of space.

In view of the foregoing, the object of the invention is basically to provide an apparatus by means of which the dust obtained from the dust removing equipment of blast furnace plants and steel works can be dewatered in an environmentally acceptable and easy and economical way.

This object is solved by an apparatus of the type wherein the mud (a liquid-solid suspension) is centrifugally dewatered by at least one centrifugal separator.

The centrifugal separator can be made as a decanter, pendulum centrifugal extractor or the like. To allow the feed to the centrifugal separator to be compatible with the separator, a feed container is associated with the centrifugal separator with the feed container having at its lower cone-shaped portion a central suspended stand pipe concentric with the inlet, the stand pipe having discharge openings above the liquid level, the cover of each feed container having cover openings and each feed container having a drain or discharge pipe located below the liquid level.

The advantages of the apparatus according to the invention are especially found in that dust produced by the dust removal equipment for blast furnace plants and steel works is dewatered in a simple way with small space requirements, small capital investment, small operating cost, and in that such dust is further environmentally acceptably dewatered and also fractionated.

The apparatus of the invention is explained in more detail hereinafter in connection with the drawings and by way of one exemplary embodiment. The drawings are:

Figure 1:
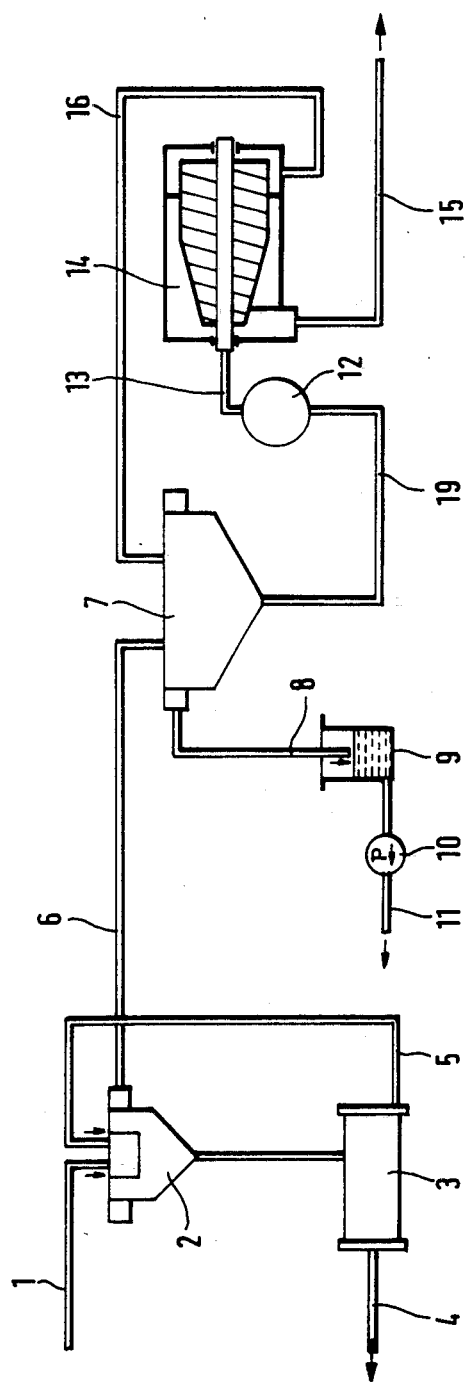
FIG. 1 is a schematic representation of the entire apparatus comprising one embodiment of the invention.

As shown in FIG. 1 the suspension flows through an inlet 1 to a coarse separator 2 in which the coarse portion is separated out and conducted through a dewatering drum 3 and conductor 4 directly back to the smelting process. Whatever dust may remain in the dewatering barrel 3 is returned through the conductor 5 to the coarse separator 2. The fine grain portion which overflows the coarse separator 2, and which at the present time is not reuseable, is conducted through the conductor 6 to a concentrator 7 and is there thickened. Cleared water from the concentrator 7 is returned to the water circuit through the conductor 8, sump 9 and pump 10 through a return line 11.

The suspension thickened in the concentrator 7 is pumped by means of a nonillustrated air lift (monopump) to a feed or storage container 12 in which the air introduced for the required lifting is removed, and the components of the suspension are homogenized by recirculation. Further by means of the feed container 12 the feed through the delivery pipe 13 is made compatible with the centrifugal separator 14. In the centrifugal separator 14 the suspension is dewatered until the dust reaches the residual moisture needed for a further processing. This dust 30 with small residual moisture can then, for example, be conducted by suitable transport means 15 to a nonillustrated solid material deposit. Cleared water from the centrifugal separator 14 is returned through a conductor 16 to the concentrator 7.

Figure 2:
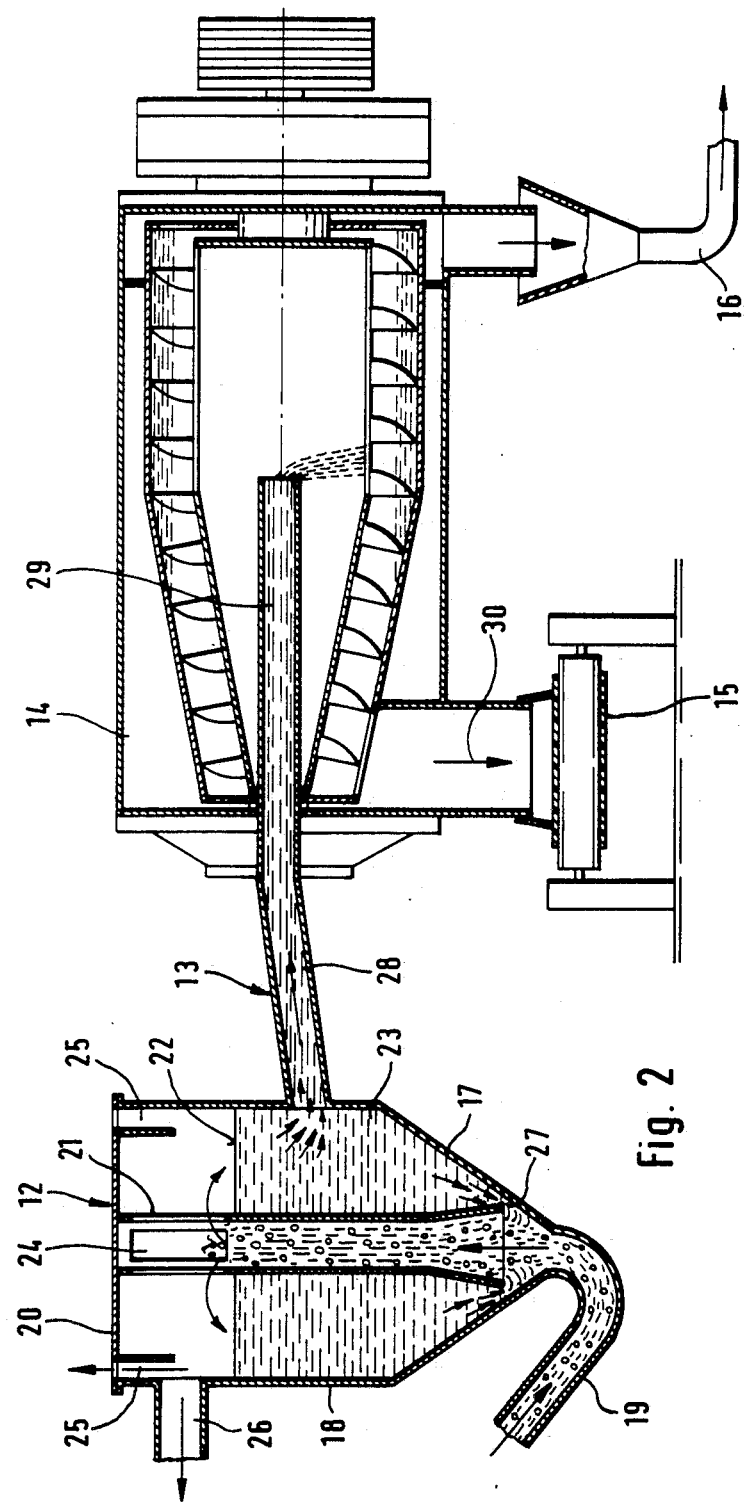
FIG. 2 is a sectional view of the centrifugal separator and associated feed container of the apparatus of FIG. 1.

FIG. 2 shows the centrifugal separator 14 with its feed or supply container 12, which container 12 consists of a lower conical portion 17 and an upper cylindrical portion 18. The inlet 19 of the feed container 12 is located at the lower end of the cone shaped portion 17. A stand pipe 21 is suspended from the center of the cover 20 and extends downwardly from the cover to the lower cone shaped portion 17 of the supply container.

Above the liquid level 22 of the suspension 23 outlet openings 24 are formed in the side of the stand pipe 21 and openings 25 are also formed in the cover 20. Moreover the feed container 12 also has an overflow 26.

The effect of the feed container 12 is such that the air loaded suspension 23 from the inlet 19 flows from the bottom of the cone shaped portion 17 into the stand pipe 21 suspended from the cover 20.

The air-suspension mixture 23 discharges from the lateral discharge openings 24 above the liquid level 22. At this point the air escapes and flows out of the container 12 through the cover openings 25.

The inflow of the air-suspension mixture 23 creates an injector effect in the annular gap 27 between the cone shaped portion 17 of the feed container 12 and the central stand pipe 21. Thereby the suspension 23 already contained in the container is in part mixed with that in the stand pipe and is newly brought to the top of the liquid body and is thereby recirculated and homogenized. A settling of the solid material in the supply container 12 is thereby avoided. The discharge pipe 13 of the feed container 12 is located below the liquid level 22.

Through an inclined portion 28 of the discharge pipe 13 the suspension 23 is conducted to a higher portion 29 which forms the inlet for the centrifugal separator 14. The pressure drop necessary for this is created by the static heighth of the suspension 23 in the supply container 12 between the liquid level 22 and the lower end of the discharge pipe 13. Since the portion 29 of the pipe 13 which forms the inlet for the separator 14 is located below the liquid level 22 it is assured that no air is introduced with the suspension 23 into the centrifugal separator 14.

This embodiment of the supply container 12 is provided for a faultless, continuous operation of the centrifugal separator 14. Air brought in with the suspension 23 would lead to cavitation effects in the centrifugal separator 14. Ununiform introduction of the suspension 23 has a direct effect on the clarification efficiency and on the product quality. Morover it also creates increased wear in the centrifugal separator 14.

With the use of a centrifugal separator for separating into coarse and fine grains uniform feed has a direct effect on the separation and cut made by the separator.

It is obviously possible, although not illustrated, to use a centrifugal separator also for the coarse grain separation. In this first centrifugal separator the coarse grains are separated out for direct reuse, are dewatered and carried away. The remaining suspension with the fine grain portion is further separated into liquids and solids in the described subsequent centrifugal separator 14. The liquid is returned to its circuit. The solids are so far dewatered that a trouble free transport in open containers and a nonobjectionable deposit onto a solid material pile is possible. In this case the same depositing techniques (emptying the containers over tilting edges) can be used as with other dewatering methods.

1. Inlet
2. Coarse Separator
3. Dewatering Drum
4. Conductor
5. Conductor
6. Conductor
7. Concentrator
8. Conductor
9. Sump
10. Pump
11. Return Line
12. Feed container
13. Discharge Pipe
14. Centrifugal Separator
15. Transport Conveyor
16. Conductor
17. Conical Portion
18. Cylindrical Portion
19. Inlet
20. Cover
21. Stand Pipe
22. Liquid Level
23. Suspension
24. Discharge Openings
25. Cover Openings
26. Overflow
27. Annular Gap
28. Inclined Pipe Portion
29. Inlet Pipe Portion
30. Fine Dust

We claim:

1. Apparatus for processing mud from dust removal equipment in the steel industry, said apparatus comprising a coarse separator means for separating said mud into a coarse liquid-solid suspension and a fine liquid-solid suspension, and a centrifugal separator means for dewatering one of said suspensions, means for transferring a portion of said one of said suspensions to a storage container means for holding a quantity of said one of said liquid-solid suspensions to be fed to said centrifugal separator and said one of said suspensions having a liquid level within said storage container means, said storage container having an upper portion and a lower cone shaped portion which defines a lower central inlet for said one of said suspensions, and said storage container means also having a cover from the center of which is hung a stand pipe which extends downwardly into said lower cone shaped portion and at its lower end forms an annular gap with the wall of said cone shaped portion, said stand pipe having outlet openings in it located above said liquid level of the suspension in said container and said cover having outlet openings for venting air from said storage container to the atmosphere, and a connecting pipe means for conducting the suspension contained in said storage container means from said storage container to said centrifugal separator means, said connecting pipe means being located below the liquid level of said one of said suspensions contained in said storage container.

2. Apparatus according to claim 1 further characterized by said centrifugal separator being a decanter centrifuge.

3. Apparatus according to claim 1 further characterized by said centrifugal separator being a pendulum centrifuge.

* * * * *